United States Patent [19]

Sugimoto

[11] 4,320,332

[45] Mar. 16, 1982

[54] SPEED CONTROL SYSTEM FOR INDUCTION MOTOR

[75] Inventor: Hidehiko Sugimoto, Nagoya, Japan

[73] Assignee: Mitsubishi Denki Kabushiki Kaisha, Tokyo, Japan

[21] Appl. No.: 169,487

[22] Filed: Jul. 16, 1980

[30] Foreign Application Priority Data

Jul. 17, 1979 [JP] Japan .................................. 54-90495

[51] Int. Cl.³ .............................................. H02P 5/40
[52] U.S. Cl. .................................... 318/798; 318/803; 318/807
[58] Field of Search ............... 318/799, 800, 801, 802, 318/803, 807, 808, 809, 810, 811, 798

[56] References Cited

U.S. PATENT DOCUMENTS 3,983,463 9/1976 Nabae et al. ......................... 318/803
4,158,801 6/1976 Hirata ................................... 318/809
4,160,940 7/1979 Wolf ...................................... 318/808

OTHER PUBLICATIONS

Maag, R. B. "Characteristics and Application of Current Source/Slip Regulated AC Induction Motor Drives" Conference Paper, IEEE-IGA Annual Meeting, Cleveland, Ohio, Oct. 18-21-71.

Primary Examiner—David Smith, Jr.
Attorney, Agent, or Firm—Wenderoth, Lind & Ponack

[57] ABSTRACT

An error amplifier is connected to both a tachometer generator for an induction motor and a command speed generator to produce an error signal corresponding to the difference between the actual motor speed and a command motor speed. A current limit generator connected to the tachometer generator generates a current limit signal which is subtracted from a motor current signal from a current sensor for the motor. A multiplier imparts to the resulting difference signal the polarity opposite to that of the error signal as determined by a polarity discriminator. The difference signal is added to the error and actual speed signals by an adder to form a command frequency signal. An inverter controls the motor in response to the command frequency signal.

3 Claims, 7 Drawing Figures

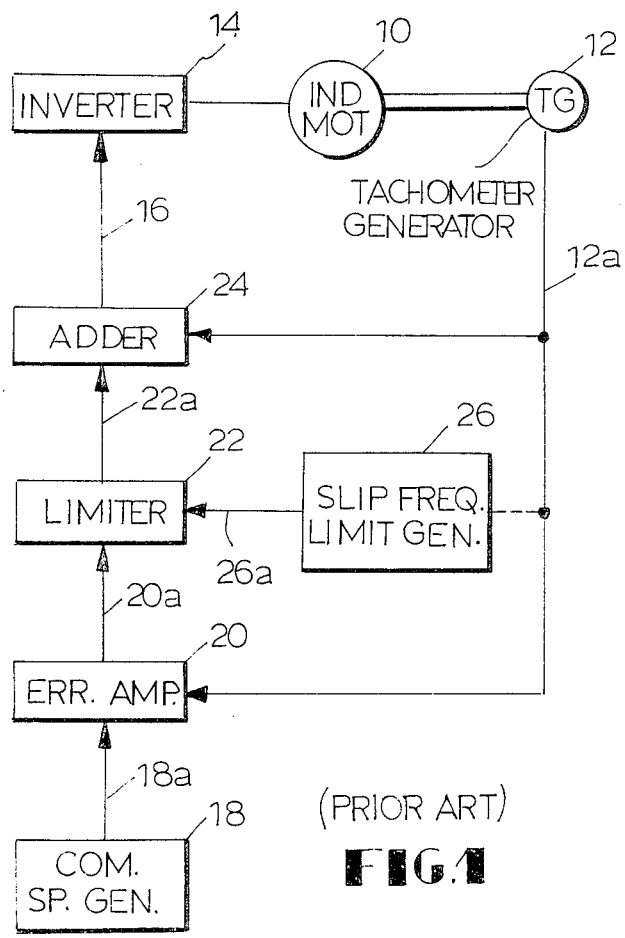
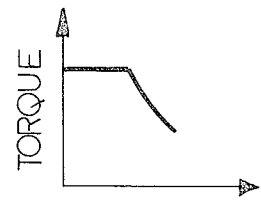
FIG. 2a
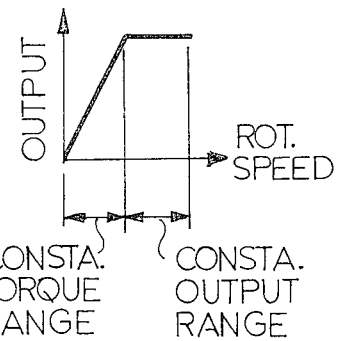
FIG. 2b
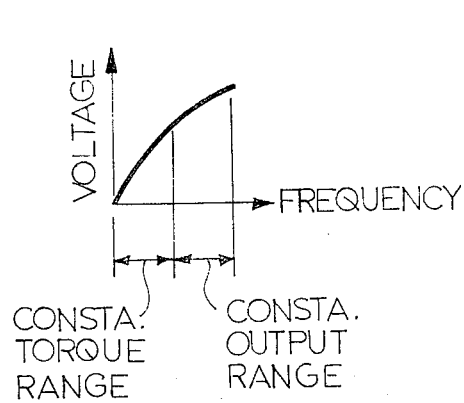
(PRIOR ART)
FIG. 3
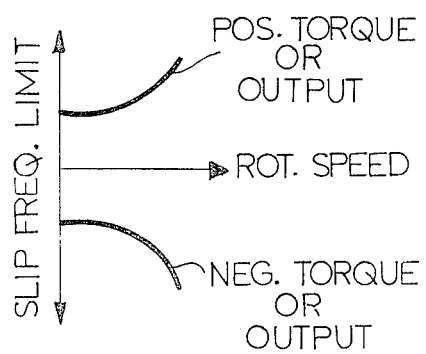
FIG. 4
(PRIOR ART)

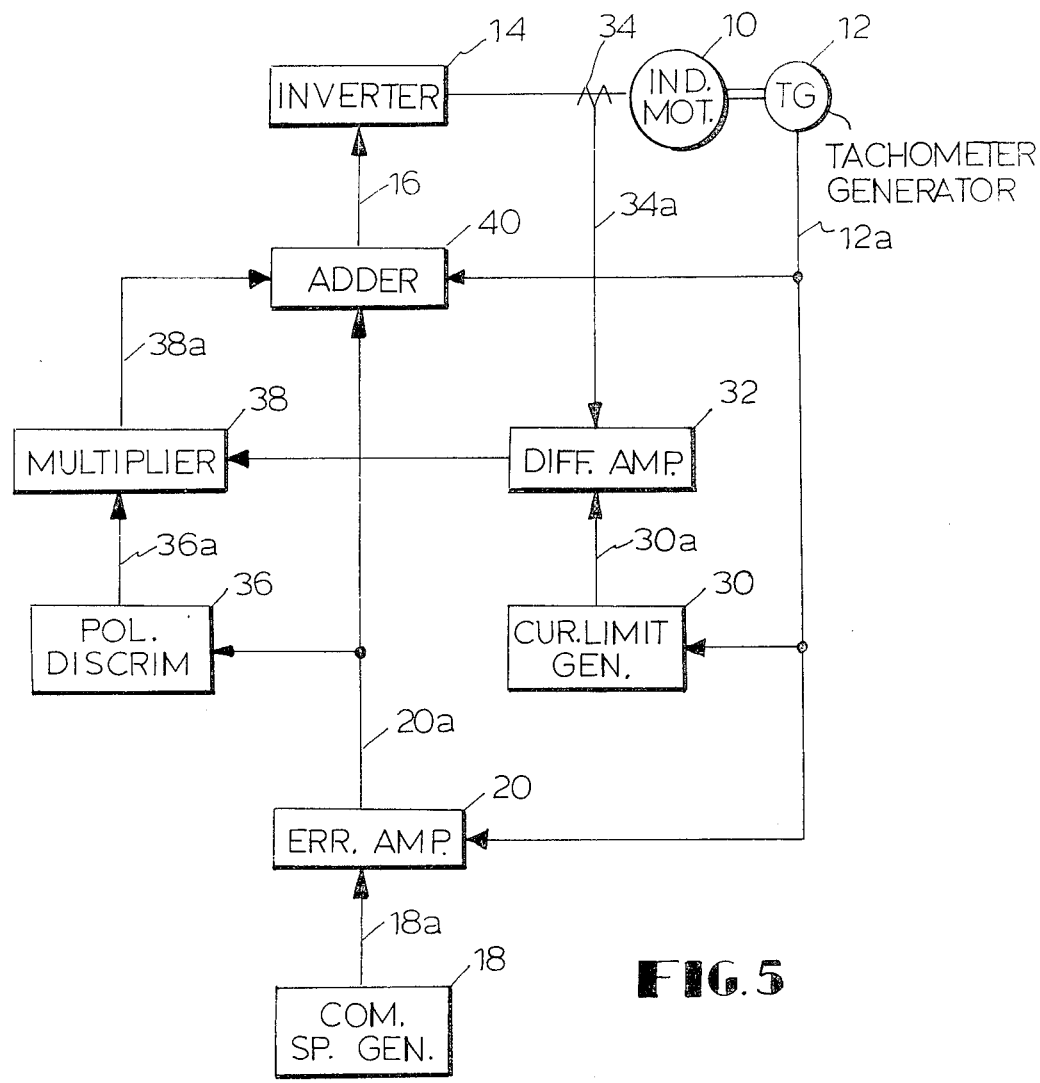
FIG.5
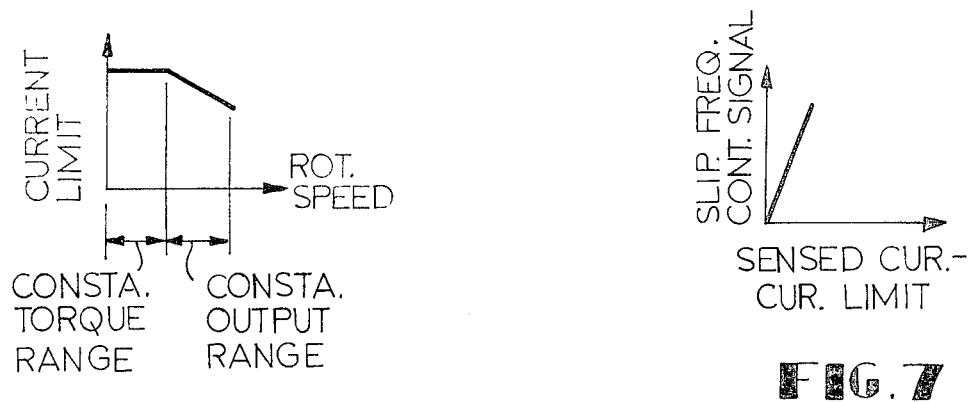
FIG.6
FIG.7

SPEED CONTROL SYSTEM FOR INDUCTION MOTOR

BACKGROUND OF THE INVENTION

This invention relates to a system for controlling a speed of an induction motor comprising a speed sensor with both a voltage applied across the induction motor and a frequency thereof, and more particularly to the limitation of a torque or an output from an induction motor controlled by such a speed control system.

Conventional speed control systems of the type referred to have comprised: an error amplifier for producing an error corresponding to the difference between the actual speed of the induction motor and the command speed therefor; a slip frequency limit generator for generating a slip frequency limit in response to the actual speed of the induction motor, and a limiter for limiting the error of the actual motor speed with respect to the slip frequency limit. Then, the adder adds an output from the limiter to the actual motor speed value and applies the resulting sum to the inverter for use as a command frequency. The inverter supplies a predetermined voltage at the command frequency to the induction motor to control the latter.

On the other hand, induction motors have the constant torque range forming the lower speed portion of the variable speed range and the constant output range forming the higher speed portion thereof. In conventional speed control systems such as described above, the induction motor has been, in many cases, controlled so that a voltage applied thereacross is approximately proportional to a frequency thereof in the constant torque range and that the square of the voltage is approximately proportional to the frequency in the constant output range. With the induction motor controlled as described above, the relationship between the rotational speed thereof and the slip frequency limit has been actually complicated and also it has been fairly troublesome to establish that relationship.

If the rotational motor speed and slip frequency limit do no fulfill their established relationship, then a current through the inverter has exceeded its permissible maximum magnitude resulting in the possibility of causing a fault thereon. In order to avoid the occurrence of the fault, the current limiting function might be imparted to the inverter. This has resulted in the disadvantage that, with the current limitation effected prior to the frequency limitation, the induction motor reduces in torque or output as compared with only the frequency limitation being effected even though the frequency limitation would have been effected after the current limitation. This is because the current limitation decreases the rotational speed of the induction motor.

Accordingly, it is an object of the present invention to provide a new and improved speed control system for an induction motor free from the disadvantages of the prior art practice as described above by limiting a slip frequency of an induction motor in the current limiting mode of operation.

SUMMARY OF THE INVENTION

The present invention provides a system for controlling a speed of an induction motor, comprising an induction motor, a speed sensor connected to the induction motor to sense the actual rotational speed of the induction motor to generate an actual speed signal, a command speed generator for generating a command speed signal for the induction motor, means for producing an error signal corresponding to the difference between the actual speed signal and the command speed signal and adding the error signal to the actual speed signal to form a command frequency signal, and an inverter responsive to the command frequency signal to deliver a voltage at a frequency corresponding to the command frequency signal to the induction motor to control the latter, wherein there are provided first means for sensing an electrical quantity relating to a torque or an output from the induction motor and delivering a signal representing a difference between the sensed electrical quantity and a predetermined limit of the electrical quantity upon the sensed quantity exceeding the predetermined limit, and second means for multiplying difference signal from the first means by a signal having the polarity determined by that of said error signal to form a product signal, and adding the product signal to the sum of the error and actual speed signals.

A preferred embodiment of the present invention may comprise: an induction motor; a speed sensor, disposed on the induction motor and used to sense the actual speed of the induction motor to generate an actual speed signal; a command speed generator for generating a command speed signal for the induction motor; an error amplifier, connected to both the speed sensor and the command speed generator, to produce and amplify an error signal corresponding to the difference between the actual speed signal and the command speed signal; a current sensor for sensing a current flowing through the induction motor to generate a sensed current signal; a current limit generator connected to the speed sensor to generate a current limit signal; a difference amplifier connected to both the current sensor and the current limit generator to produce and amplify a slip frequency control signal in response to a difference signal between the sensed current and the current limit signals, a polarity discriminator connected to the error amplifier to discriminate the polarity of the error signal to deliver a polarity imparting signal; a multiplier connected to both the polarity discriminator and the difference amplifier to multiply the slip frequency control signal by the polarity imparting signal; adder means connected to the speed sensor, the error amplifier and the multiplier to add the actual speed signal, the error signal and an output from the multiplier to one another to deliver a command frequency signal; and an inverter responsive to the command frequency signal to supply to the induction motor a predetermined voltage at a frequency determined by the command frequency signal.

BRIEF DESCRIPTION OF THE DRAWINGS

The present invention will become more readily apparent from the following detailed description taken in conjunction with the accompanying drawings in which:

FIG. 1 is a block diagram of a conventional speed control system for an induction motor;

FIG. 2A is a graph illustrating the relationship between a torque and a rotational speed of an induction motor;

FIG. 2B is a graph similar to FIG. 2A but illustrating an output plotted against the rotational speed of the induction motor;

FIG. 3 is a graph illustrating the relationship between a frequency of and a voltage across an induction motor according to which the arrangement shown in FIG. 1 controls the induction motor;

FIG. 4 is a graph illustrating the relationship between a rotational speed of and a slip frequency limit for the induction motor generated by the slip frequency limit generator shown in FIG. 1;

FIG. 5 is a block diagram of a speed control system for an induction according to the present invention;

FIG. 6 is a graph illustrating the relationship between a rotational speed of and a current through an induction motor developed in the arrangement shown in FIG. 5; and FIG. 7 is a graph illustrating the relationship between a slip frequency control signal and a motor current minus a current limit delivered by the difference amplifier shown in FIG. 5.

DESCRIPTION OF THE PREFERRED EMBODIMENT

Referring now to FIG. 1 of the drawings, there is illustrated a conventional speed control system for an induction motor. The arrangement illustrated comprises an induction motor 10, a speed sensor 12, in this case, a tachometer generator directly connected to the induction motor 10 and an inverter 14. The inverter 14 has applied thereto a command frequency signal 16 as will be described later and supplies a predetermined voltage at a frequency as determined by the command frequency signal to the induction motor 10.

The arrangement comprises further a command speed generator 18, an error amplifier 20, a limiter 22 and an adder 24 serially connected to one another in the named order. The speed sensor 12 senses the actual rotational speed of the induction motor 10 to supply an actual speed signal 12a to the error amplifier 20 where a difference or an error signal between the speed signal 12a and a command speed signal 18a delivered from the command speed generator 18 is produced and amplified. It is assumed that the error signal 20a is positive when the command speed signal 18a is smaller than the actual speed signal 12a.

Then, the error signal 20a is applied to the limiter 22 which is also supplied with a slip frequency limit signal 26a from a slip frequency limit generator 26 coupled to the speed sensor 12. The limiter 22 is operative to limit the error signal 20a to a predetermined magnitude. More specifically, when the error signal 20a is smaller than a predetermined magnitude as determined by the slip frequency limit signal 26a, the limiter 22 supplies to the adder 24 the error signal remaining intact, as a slip speed signal 22a. Otherwise the limiter 22 supplies the slip speed signal 22a having the predetermined magnitude to the adder 24.

The adder 24 is operative to add the slip speed signal 22a from the limiter 22 to the actual speed signal 12a from the speed sensor 12 to produce an output whose magnitude corresponds to the frequency of the induction motor 10.

As described above, that output forms the command frequency signal 16 which is, in turn, applied to the inverter 14.

The description will now be made in conjunction with the determination of the output signal 26a from the slip frequency limit generator 26, that is, the magnitude of the slip frequency limit signal. It is assumed that the output characteristic required for the induction motor 10 is such that the latter produce a constant torque throughout the variable speed range thereof. Under the assumed conditions, the induction motor 10 is controlled so as to maintain the quotient of a voltage thereacross divided by a frequency thereof which is approximately constant. Under these circumstances, as a slip frequency for each frequency increases, a torque also increases with substantially same increments as the slip frequency. Therefore, the output signal 26a from the slip frequency limit generator 26 is rendered constant in spite of the rotational speed of the induction motor 10.

On the other hand, the output characteristic required for the induction motor 10 may be such that it have the constant torque characteristic in a lower speed portion of the variable speed range and the constant output characteristic in a higher speed portion thereof, as shown in FIGS. 2A and 2B. In FIG. 2A, wherein the torque of the induction motor 10 is plotted in the ordinate against the rotational speed thereof in the abscissa, it is seen that the torque is maintained constant up to a certain rotational speed or in the lower speed portion of the variable speed range and then decreased in the higher speed portion thereof. Also in FIG. 2B, wherein the output is plotted in the ordinate against the rotational speed in the abscissa, it is seen that the output is linearly increased with the rotational speed in the lower speed portion of the variable speed range labelled CONST. TORQUE RANGE and then maintained constant regardless of the rotational speed in the higher speed portion thereof labelled CONST. OUTPUT RANGE.

Under these circumstances, the induction motor 10 has been, in many cases, controlled so as to maintain the quotient of the voltage thereacross divided by the frequency thereof approximately constant in the lower speed portion of the variable speed range or the constant torque range and maintain the quotient of the square of the voltage thereacross divided by the frequency approximately constant in the higher speed portion thereof or the constant output range. FIG. 3 shows the relationship between the voltage across the induction motor plotted in ordinate and the frequency thereof plotted in abscissa developed in the control as described above. From FIG. 3, it is seen that the voltage linearly increases with an increase in frequency in the constant torque range and follows a parabolic curve in the constant output range. In other words, the slip frequency for each frequency and the torque are similarly increased in the constant torque range while as the rotational speed becomes higher in the constant output range, the slip frequency tends to increase in the constant output range with the output remaining unchanged.

As a result, the slip frequency limit generator 26 is arranged to generate the slip frequency limit signal 26a meeting the abovementioned relationship between the same and the speed signal 12a from the speed sensor 12. FIG. 4 shows one example of a slip frequency limit which is generated by the generator 26 and which is dependent upon the actual speed signal 12a applied thereto.

From FIG. 4, it is seen that, for each of positive and negative torques or outputs, the slip frequency limit plotted on the axis of the ordinates is substantially constant with an increase in rotational speed plotted on the axis of abscissa in the constant torque range. In the constant output range, however, that limit is much increased with respect to the rotational speed.

In order to generate the slip frequency limit following curve as shown in FIG. 4, it is usual to employ operational amplifiers or memory elements which are supplied with the actual speed signals. However, in order to provide the combined constant torque and output characteristic, the relationship between the rotational speed and the slip frequency limit is actually complicated and it is fairly troublesome to establish that relationship. Also with the inverter 14 in view, the same has a permissible maximum current as determined by semiconductor and other elements and others included therein. If the rotational speed and the slip frequency limit do not meet the established relationship therebetween, then a current through the inverter exceeds its permissible maximum magnitude leading to the possibility of causing a fault on the inverter.

While the inverter may perform the current limiting function, this measure has resulted in the disadvantage that, if the current limitation is effected prior to the frequency limitation then, the induction motor decreases in torque or output as compared with only the frequency limitation being effected, even though the frequency limitation would be effected after the current limitation.

The present invention contemplates to eliminate the disadvantages as described above by limiting a slip frequency in the current limiting mode of operation of an induction motor.

Referring now to FIG. 5 wherein like reference numerals designate the components identical to those shown in FIG. 1, there is illustrated a system for controlling a rotational speed of an induction motor in accordance with the present invention. In the arrangement illustrated, a current limit generator 30 is substituted for the slip frequency limit generator 26 and connected to a difference amplifier 32. Then, a current sensor 34 such as a current transformer is electromagnetically coupled to a lead connecting the inverter 14 to the induction motor 10 to sense the current flowing through the induction motor 10 and also connected to the difference amplifier 32. Also, a polarity discriminator 36 is serially connected to a multiplier 38 across the error amplifier 20 and an adder 40. The multiplier 38 is connected at the output to the difference amplifier 32 and the adder 40 is also connected directly to the error amplifier 20 and further connected at one of the inputs to the speed sensor 12.

In other respects the arrangement is substantially identical to that shown in FIG. 1.

Where the induction motor has the combined constant torque and output characteristic and a voltage applied thereacross and the frequency fulfilling the relationship as shown in FIG. 3, the current limit generator 30 generates a current limit signal 30a fulfilling the relationship between the latter and the rotational speed of the induction motor 10 as shown in FIG. 6. As shown in FIG. 6, the current limit signal 30a is maintained constant with an increase in rotational speed in the constant torque range and is linearly decreased with the rotational speed in the constant output range.

The difference amplifier 32 produces and amplifies a difference signal between the current limit signal 30a and an output signal 34a representing the sensed motor current in response to the sensed motor current exceeding the current limit from the current limit generator 30. The resulting difference signal forms a slip frequency control signal 32a as shown in FIG. 7 wherein the slip frequency control signal is plotted in the ordinate against a signal for the sensed motor current minus the current limit plotted in the abscissa. As shown, the slip frequency control signal 32a linearly increases with respect to the difference between the motor current and the current limit.

The polarity discriminator 36 discriminates the polarity of the error signal 20a from the error amplifier 20 so that a polarity imparting signal 36a having a value of plus one is delivered to the multiplier 36 when the error signal 20a has a negative polarity as discriminated thereby and that a polarity imparting signal 36a having a value of minus one is delivered to the multiplier 36 when the error signal 20a has a positive polarity as discriminated thereby. A negative polarity of the error signal 20a means that the induction motor 10 is generating a negative torque while a positive polarity thereof means that the induction motor 10 is generating a positive torque.

The multiplier 38 multiplies the slip frequency control signal 32a by the polarity imparting signal 36a to deliver a product signal 38a of the two signals to the adder 40. The product signal 38a is identical to the error signal 20a with a positive polarity when the torque from the induction motor 10 is positive and to that with a negative polarity when the torque is negative.

The adder 40 adds the product signal 38a, the error signal 20a and the actual speed signal 12a to one another to form a command frequency signal 16 which is, in turn, applied to the inverter 14. In this case, the sum of the product signal 38a and the error signal 20a corresponds to a command slip frequency.

Therefore, it is seen that, even though the induction motor 10 would be generating, for example, a positive torque so that the error signal 20a from the error amplifier 20 has a high value with a positive polarity, the slip frequency control signal 32a from the difference amplifier 32 can suppress the error signal to limit a slip frequency. This is true in the case of a negative torque. Therefore, the torque or output from the induction motor 10 can be limited.

From the foregoing it is seen that the present invention can determine a current limit in conformity with a torque or an output limit and then determine a slip frequency limit by that current limit. This eliminates the necessity of establishing a current limit and a slip frequency limit independently as in the prior art practice. Accordingly, the induction motor is prevented from reducing in torque or output as a result of the current and slip frequency limits deviating from their established values. This results in the advantage that the current limit can be relatively easily set in a current range permitted for an inverter involved.

While the present invention has been illustrated and described in conjunction with a single preferred embodiment thereof, it is to be understood that numerous changes and modifications may be resorted to without departing from the spirit and scope of the present invention. For example, the present invention may be equally carried out by utilizing a power factor of an induction motor in place of a difference between a current through the induction motor and a current limit.

What is claimed is:

1. A system for controlling a rotational speed of an induction motor, comprising an induction motor, a speed sensor connected to said induction motor to sense the actual rotational speed of said induction motor to generate an actual speed signal, a command speed generator for generating a command speed signal for the induction motor, means for producing an error signal corresponding to the difference between said actual speed signal and said command speed signal and for adding said error signal to said actual speed signal to form a command frequency signal, and an inverter responsive to said command frequency signal to deliver a voltage at a frequency corresponding to said command frequency signal to said induction motor to control the latter; wherein there are provided first means for sensing an electrical quantity relating to a torque or an output from said induction motor and for delivering a signal representing a difference between said sensed electrical quantity and a predetermined limit of the electrical quantity when said sensed electrical quantity exceeding said predetermined limit, and second means for multiplying said difference signal from said first means by a signal having the polarity determined by that of said error signal to form a product signal, and for adding said product signal to the sum of said actual and error speed signals.

2. A system for controlling a rotational speed of an induction motor as claimed in claim 1 wherein said first means senses a current flowing through said induction motor as said difference signal, a slip frequency control signal representing a difference between said sensed current and a predetermined current limit.

3. A system for controlling a rotational speed of an induction motor, comprising an induction motor, comprising an induction motor, a speed sensor disposed on said induction motor to sense the actual rotational speed of said induction motor to generate an actual speed signal, a command speed generator for generating a command speed signal for the induction motor, an error amplifier connected to both said speed sensor and said command speed generator to produce and amplify an error signal corresponding to the difference between said actual speed signal and said command speed signal, a current sensor for sensing a current flowing through said induction motor to generate a sensed current signal, a current limit generator connected to said speed sensor to generate a current limit signal, a difference amplifier connected to both said current sensor and said current limit generator to produce and amplify a slip frequency control signal in response to a difference between said sensed current signal and said current limit signal, a polarity discriminator connected to said error amplifier to discriminate the polarity of said error signal to deliver a polarity imparting signal, a multiplier connected to both said polarity discriminator and said difference amplifier to multiply said slip frequency control signal by said polarity imparting signal, adder means connected to said speed sensor, said error amplifier and said multiplier to add said actual speed signal, said error signal and an output from said multiplier together to deliver a command frequency signal, and an inverter responsive to said command frequency signal to supply to said induction motor with a predetermined voltage at a frequency determined by said command frequency signal.

* * * * *